United States Patent
Amis et al.

(10) Patent No.: US 7,580,382 B1
(45) Date of Patent: Aug. 25, 2009

(54) SYSTEM AND METHOD FOR DISTRIBUTED CHANNELIZED GROUP FORMATION IN A MOBILE WIRELESS COMMUNICATION NETWORK

(75) Inventors: Alan D. Amis, Plano, TX (US); Frank W. Miller, Baltimore, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 320 days.

(21) Appl. No.: 11/235,788

(22) Filed: Sep. 27, 2005

(51) Int. Cl.
*H04B 7/00* (2006.01)

(52) U.S. Cl. ............... 370/310; 370/329; 370/400; 370/458; 370/332; 370/335; 370/421; 370/408; 370/445; 370/338; 370/431; 370/254; 370/503; 709/235

(58) Field of Classification Search .......... 370/445, 370/328, 448, 338, 506, 350, 317, 455, 254, 370/329, 431, 458, 22; 706/22; 709/221, 709/235; 455/422.1; 703/22
See application file for complete search history.

(56) References Cited

U.S. PATENT DOCUMENTS

| | | | | |
|---|---|---|---|---|
| 5,343,472 | A * | 8/1994 | Michihira et al. | 370/445 |
| 5,949,760 | A | 9/1999 | Stevens et al. | 370/254 |
| 6,275,497 | B1 * | 8/2001 | Varma et al. | 370/431 |
| 6,317,436 | B1 | 11/2001 | Young et al. | 370/443 |
| 6,331,973 | B1 | 12/2001 | Young et al. | 370/337 |
| 6,487,186 | B1 | 11/2002 | Young et al. | 370/336 |
| 6,496,941 | B1 * | 12/2002 | Segal et al. | 714/4 |
| 6,504,829 | B1 | 1/2003 | Young et al. | 370/337 |
| 6,515,973 | B1 | 2/2003 | Young | 370/329 |
| 6,574,199 | B1 | 6/2003 | Young et al. | 370/254 |
| 6,574,206 | B2 | 6/2003 | Young | 370/337 |
| 6,600,754 | B1 | 7/2003 | Young et al. | 370/459 |
| 6,628,636 | B1 | 9/2003 | Young | 370/337 |
| 6,711,177 | B1 | 3/2004 | Young | 370/468 |
| 6,754,176 | B1 * | 6/2004 | Gubbi et al. | 370/230 |
| 7,158,484 | B1 * | 1/2007 | Ahmed et al. | 370/254 |
| 2002/0027894 | A1 * | 3/2002 | Arrakoski et al. | 370/338 |
| 2003/0012166 | A1 * | 1/2003 | Benveniste | 370/338 |
| 2003/0139918 | A1 * | 7/2003 | Hardwick et al. | 703/22 |
| 2004/0095911 | A1 * | 5/2004 | Benveniste et al. | 370/338 |
| 2004/0218922 | A1 * | 11/2004 | Giles et al. | 398/57 |
| 2004/0240426 | A1 * | 12/2004 | Wu et al. | 370/350 |
| 2006/0198337 | A1 * | 9/2006 | Hoang et al. | 370/329 |
| 2006/0215581 | A1 * | 9/2006 | Castagnoli | 370/254 |
| 2006/0215582 | A1 * | 9/2006 | Castagnoli et al. | 370/254 |

(Continued)

OTHER PUBLICATIONS

Amis et al., "Load-Balancing Clusters in Wireless Ad Hoc Networks", undated (8 pgs.).

(Continued)

*Primary Examiner*—Rafael Pérez-Gutiérrez
*Assistant Examiner*—Joseph Arevalo
(74) *Attorney, Agent, or Firm*—Daniel M. Barbieri

(57) ABSTRACT

A method for forming channelized groups in a wireless communication network having a plurality of nodes. At least one node in the network is assigned to a first channel that is associated with a channelized group having a first set of nodes. The method determines whether there is contention between the at least one node and the first set of nodes. In addition, the method includes switching the at least one node from the first channel to a second channel based on the contention determination.

18 Claims, 5 Drawing Sheets

U.S. PATENT DOCUMENTS

2006/0215583 A1\* 9/2006 Castagnoli .................. 370/254
2007/0211749 A1\* 9/2007 Benveniste .................. 370/445

OTHER PUBLICATIONS

Amis et al., "Max-Min D-Cluster Hormation in Wireless Ad Hoc Netowrks", undated (10 pgs.).

Baker et al., "The Architectural Organization of a Mobile Radio Network via a Distributed Algorithm", *IEEE Transactions on Communications*, vol. Com-29, No. 11, Nov. 1981 (pp. 1694-1701).

Baker et al., "The Design and Simulation of a Mobile Radio Network with Distributed Control", IEEE Journal on Selected Areas in Communications, vol. SAC-2, No. 1, Jan. 1983 (pp. 226-237).

Das et al., "Routing in Ad Hoc Networks Using a Spine", *IEEE*, Coordinated Sciences Laboratory, University of Illinois at Urbana-Champaign, 1997 (pp. 34-39).

Das et al., "Routign in Ad-Hoc Networks Using Minimum Connected Dominating Sets", Coordinated Science Laboratory, University of Illinois at Urbana-Champaign, undated (pp. 1-5).

Ephremides, et al., "A Design Concept for Reliable Mobile Networks with Frequency Hopping Signaling", *Proceedings of the IEEE*, vol. 75, No. 1, Jan. 1987 (pp. 56-73).

Gerla et al., "Multicluster, mobile, multimedia radio network", *Baltzer Journals*, Jul. 12, 1995 (pp. 1-26).

Jia, et al., "An Efficient Distributed Algorithm for Costructing Small Dominating Sets", College of Computer Science, Northeastern University and Department of Computer and Information Science, undated (10 pgs.).

Krishna et al., "A Cluster-based Approach for Routing in Dynamic Networks", undated (16 pgs.).

McDonald et al., "A Mobility-Based Framework for Adaptive Clustering in Wireless Ad Hoc Networks", IEEE Journal on Selected Areas in Communications, vol. 17, No. 8, Aug. 1999 (pp. 1466-1487).

Parekh, Abhay K., "Selecting Routers in Ad-hoc Wireless Networks", undated (18 pgs.).

Ramanathan et al., "Hierarchically-organized, multihop mobile wireless networks for quality-of-service support", undated (42 pgs.).

Sharony, Jacob, "An Architecture for Mobile Radio Networks with Dynamically Changing Topology Using Virtual Subnets", undated (pp. 1-12).

Sivakumer et al., "CEDAR: a Core-Extraction Distributed Ad hoc Routing algorithm", IEEE Journal on Selected Areas in Communication, vol. 17, No. 8, Aug. 1999 (pp. 1-12).

Internet-Draft, "Cluster Based Routing Protocol (CBRP)", available at http://www.comp.nus.edu.sq/~tayyc/cbrp/draft-ietf-manet-cbrp-spec-01.txt, available at least by Jul. 25, 2005 (38 pages).

\* cited by examiner

SYSTEM AND METHOD FOR DISTRIBUTED CHANNELIZED GROUP FORMATION IN A MOBILE WIRELESS COMMUNICATION NETWORK

FIELD OF THE INVENTION

The present invention relates generally to communication networks and in particular, to a system and method for forming channelized groups of nodes in a mobile wireless communication network.

BACKGROUND OF THE INVENTION

Wireless communication networks may be used for numerous applications including tactical military and commercial applications. Tactical military and commercial applications require self-organizing, wireless networks that can operate in dynamic environments and provide peer-to-peer, multi-hop, multi-media communications. A structured wireless channel access scheme such as Time Division Multiple Access (TDMA) may be used in an ad hoc wireless network. TDMA is a channel access technique in which a frequency channel is divided into time slots and each time slot is assigned to a user. Accordingly, multiple transmissions may be supported on a single frequency channel.

Wireless ad hoc networks form topologies ranging from very sparse to fully connected graphs. Multiple channels may be used to allow simultaneous communication of neighboring nodes, for example, in a network with a dense topology. A multi-channel (or multi-frequency) TDMA access scheme such as Orthogonal Domain Multiple Access (ODMA) may be utilized to support multiple channels. Multi-channel time division multiple access is the subject of U.S. Pat. Nos. 5,949,760; 6,317,436; 6,331,973; 6,487,186; 6,504,829; 6,515,973; 6,574,199; 6,574,206; 6,600,754; 6,628,636 and 6,711,177, the disclosures of which are herein incorporated by reference.

In a multi-channel network, subsets of nodes in the network may be grouped on a particular frequency or channel (i.e., nodes are formed into a channelized group or neighborhood). A channelized group of nodes may be formed for each channel of the multi-channel network. Typically, each node belongs to only one channelized group at a time, but a node may operate on two or more channelized groups to allow inter-channel communications. As the topology of a network changes (i.e., mobile nodes move positions), however, it is possible that there may be interference or contention in a channelized group on the associated channel.

Accordingly, there is a need for a system and method for forming channelized groups of nodes in order to avoid contention on any single channel of a multi-channel communication network. There is also a need for a system and method to determine if there is contention on a particular channel and to determine when a node should change its channel (i.e., switch to a different channelized group) to avoid contention.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

In accordance with one embodiment, a method for forming channelized groups in a wireless communication network having a plurality of nodes includes determining for at least one node assigned to a first channel that is associated with a channelized group having a first set of nodes whether there is contention between the at least one node and the first set of nodes and switching the at least one node from the first channel to a second channel based on the contention determination In accordance with another embodiment, a node for a wireless communication network, the node assigned to a first channel associated with a channelized group having a first set of nodes, includes an antenna, a transceiver coupled to the antenna and configured to transmit and receive messages, and a control circuit coupled to the transceiver and configured to determine whether there is contention with the first set of nodes and to switch operation from the first channel to a second channel based on the contention determination.

BRIEF DESCRIPTION OF THE DRAWINGS

The invention will be more readily understood by reference to the following description taken with the accompanying drawings, in which.

DETAILED DESCRIPTION OF THE PREFERRED EMBODIMENTS

Figure 1:
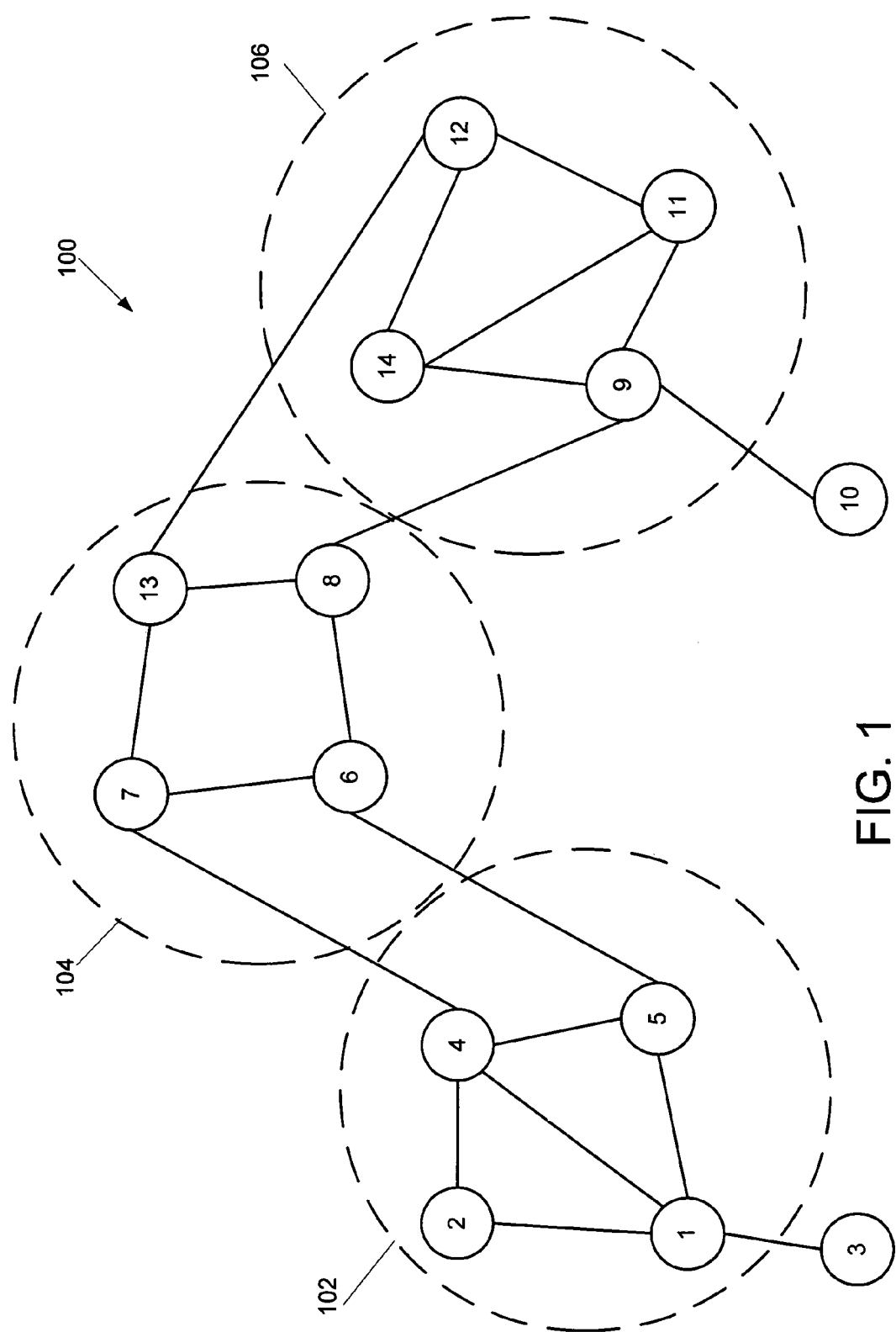
FIG. 1 is a diagram of a wireless communication network having a plurality of nodes in accordance with an embodiment.

FIG. 1 is a diagram of a wireless communication network 100 including a plurality of nodes in accordance with an embodiment. In an exemplary embodiment, wireless communication network 100 may be, for example, a Joint Tactical Radio System (JTRS). Wireless communication network 100 includes channelized neighborhoods or groups 102, 104, 106 that separate the nodes of network 100 onto different channels (or frequencies) for communication and allow for spatial frequency reuse within network 100. Channelized group 102 consists of nodes 1, 2, 4 and 5 that are each assigned to a first channel. Channelized group 104 consists of nodes 6, 7, 8 and 13 that are each assigned to a second channel. Channelized group 106 consists of nodes 9, 11, 12 and 14 that are assigned to a third channel. Typically, nodes that exchange large amounts of traffic with one another are assigned to the same channel. A transmission from one node is broadcast to all nodes in its neighborhood on the associated channel, for example, those nodes within the line of sight or one-hop of the transmitting node. Typically, for the transmitted data to propagate multiple hops, the data must be relayed by one or more of these neighbors to the nodes that are two hops away from the original transmitting node. Nodes within each channelized group may also communicate with nodes outside their particular channelized group, i.e., inter-channel communication (for example, node 4 may communicate with node 7 on the second channel).

The formation of channelized groups in a multi-channel network may be based on the network topology, i.e., whether the network is sparsely connected or densely connected or formed. If the network is sparsely connected, in an embodiment, the nodes will group themselves on a common default channel. This may improve communications efficiency because it will eliminate the need for inter-channel communications. Each node will try to associate itself with a default channelized group unless the node has been explicitly set to different channel in a communications plane (COMPLAN) or there are other reasons to migrate to a different channel as discussed further below. In a fully connected or densely formed network, the node will group themselves in a distributed fashion across all channels possible. In a preferred embodiment, the nodes are evenly divided among the channelized groups when a network is fully connected or densely formed. For example, if there are 140 nodes and five channels, there would be 28 nodes per channel (or channelized group).

Figure 2:
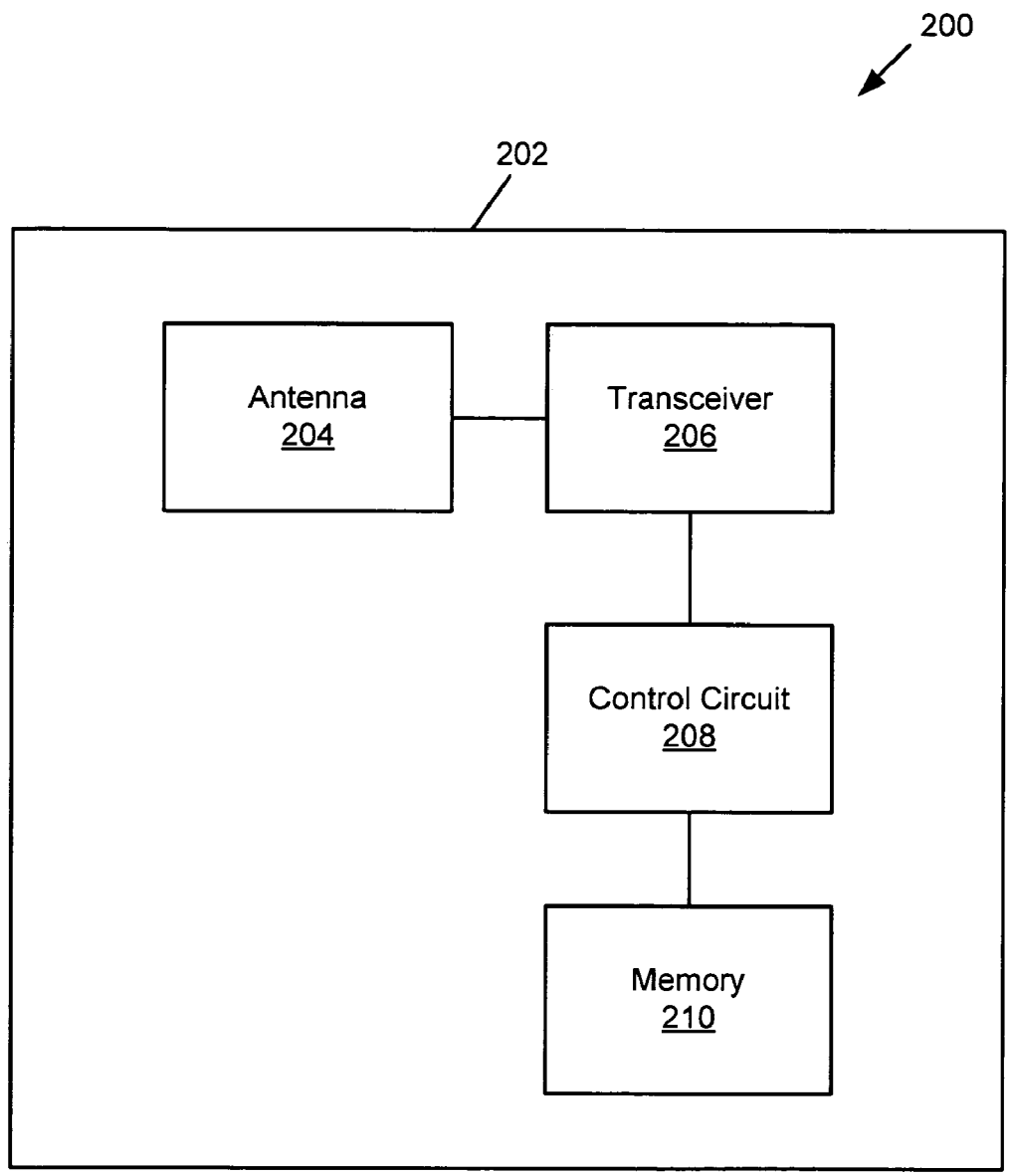
FIG. 2 is a schematic block diagram of a node for a wireless communication network in accordance with an embodiment.

FIG. 2 is a schematic block diagram of a node for a wireless communication network in accordance with an embodiment. In an exemplary embodiment, node 200 is a mobile node, e.g., a radio in a military vehicle. Node 200 includes an antenna 204, a transceiver 206, a control circuit 208 and a memory 210. Transceiver 206 is coupled to antenna 204 and control circuit 208. Transceiver 206 includes transmit and receive circuitry and is configured to transmit and receive signals via antenna 204. Node 200 is configured to communicate with (e.g., receive signals from and transmit signals to) other nodes in a communication network. Control circuit 208 is coupled to transceiver 206 and memory 210. Control circuit 208 may include various types of control circuitry, digital and/or analog, and may include a microprocessor, microcontroller, application specific integrated circuit (ASIC), or other digital and/or analog circuitry configured to perform various input/output, control, analysis, and other functions described herein. Memory 210 includes volatile and/or no-volatile memory to, for example, store a computer program or software to perform the functions described herein. Control circuit 208 may execute sequences of instructions contained in memory 210. In an exemplary embodiment, node 200 is configured to communicate in an ad hoc manner using a structured wireless channel access scheme such as TDMA and in particular, a multi-channel TDMA format such as ODMA. Accordingly, control circuit 208 is configured to implement an access protocol (e.g., ODMA) in order to transmit messages to and receive messages from other nodes via transceiver 206 and antenna 204.

Figure 3:
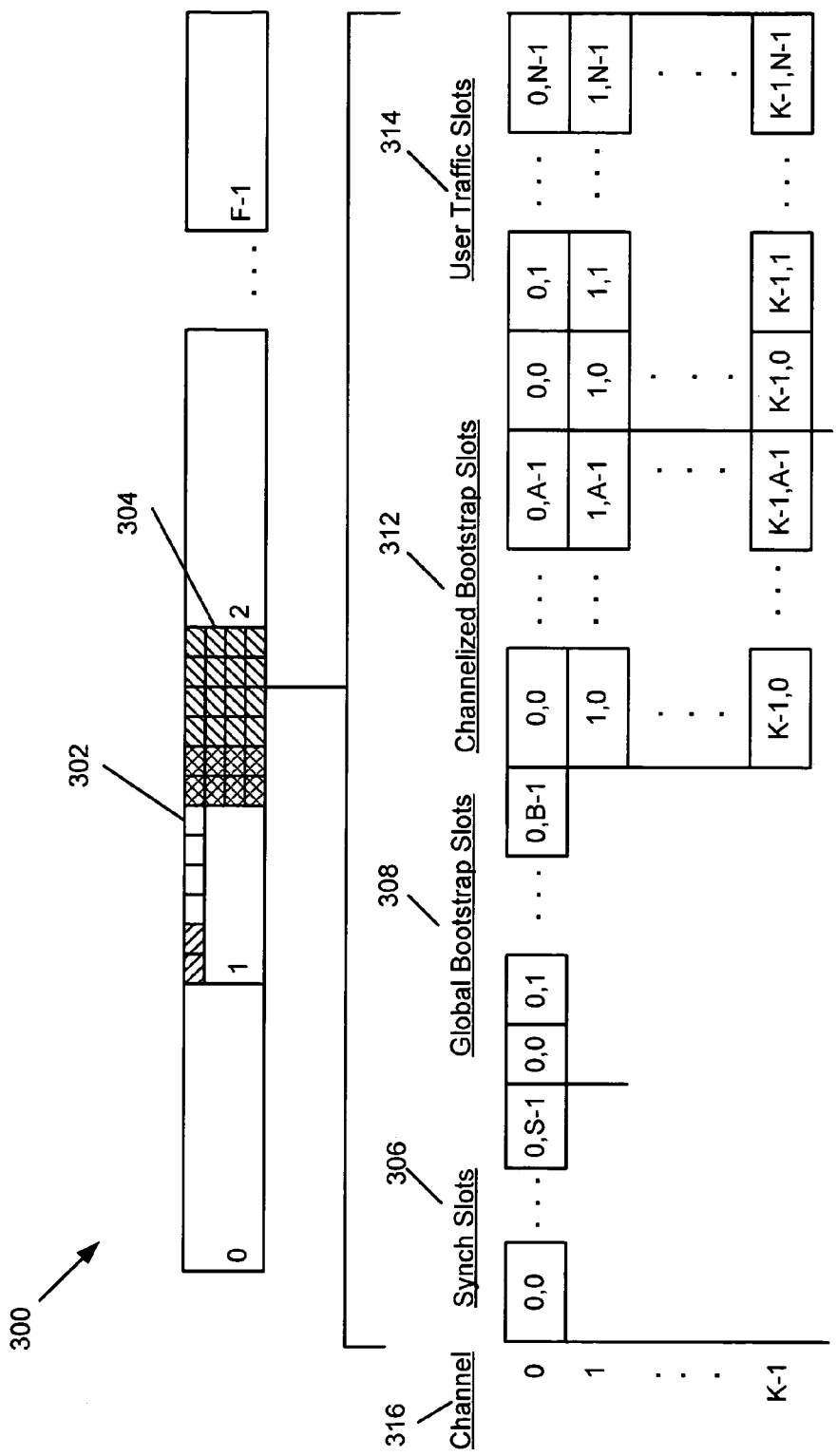
FIG. 3 is an exemplary multi-channel TDMA structure in accordance with an embodiment.

FIG. 3 is an exemplary diagram of a multi-channel TDMA structure in accordance with an embodiment. Multi-channel TDMA structure 300 includes a plurality of frames 302 that are associated with a plurality of non-overlapping radio frequency channels 304, 316. As mentioned above with respect to FIG. 1, nodes in network 100 are divided and grouped onto different default channels, i.e., into channelized groups or neighborhoods. Each frame 302 includes time slots during which a node may transmit or receive information. For example, each frame may include synch slots 306, global bootstrap slots 308, channelized bootstrap slots 312 and user traffic slots 314. Global bootstrap slots 308 may be used to carry slot assignment information and provide a means by which each node may discover their neighbors, either belonging to the same channel or a different channel. A global bootstrap slot 308 may include at least the following information: 1) the transmitting node's identification, 2) the transmitting node's status and 3) slot assignment information necessary to reserve user traffic slots. Channelized bootstrap slot 312 may be used to communicate slot assignment information for user traffic slots of a particular channel as well as channelized bootstrap slot assignment information. User traffic slots 314 may be broadcast or unicast slots. Broadcast slots may be used for multicast transmission (e.g., data messages) to other nodes on the same channel. Unicast slots may be used for inter-channel communication. User traffic slots 314 may be reserved via either global bootstrap slots 308 or channelized bootstrap slots 312.

Returning to FIG. 2, control circuit 208 of node 200 is configured to determine when there will be channel contention and when to switch channels (e.g., when to switch to a different channelized group). Each node 200 in a network may be initially provided with a parameter, for example, in a communication plan (COMPLAN), that identifies a channel for the node to use initially. A node, however, may determine it should change its channelized group membership (e.g., migrate to a different channel) based on contention on the current channel, changes in network topology or other factors. Preferably, each node 200 in a network is configured to determine which channel is appropriate for optimal performance initially at power up and during operation. Accordingly, each node may independently make decisions regarding the appropriate channel on which to operate (i.e., determine the appropriate channelized group).

Figure 4:
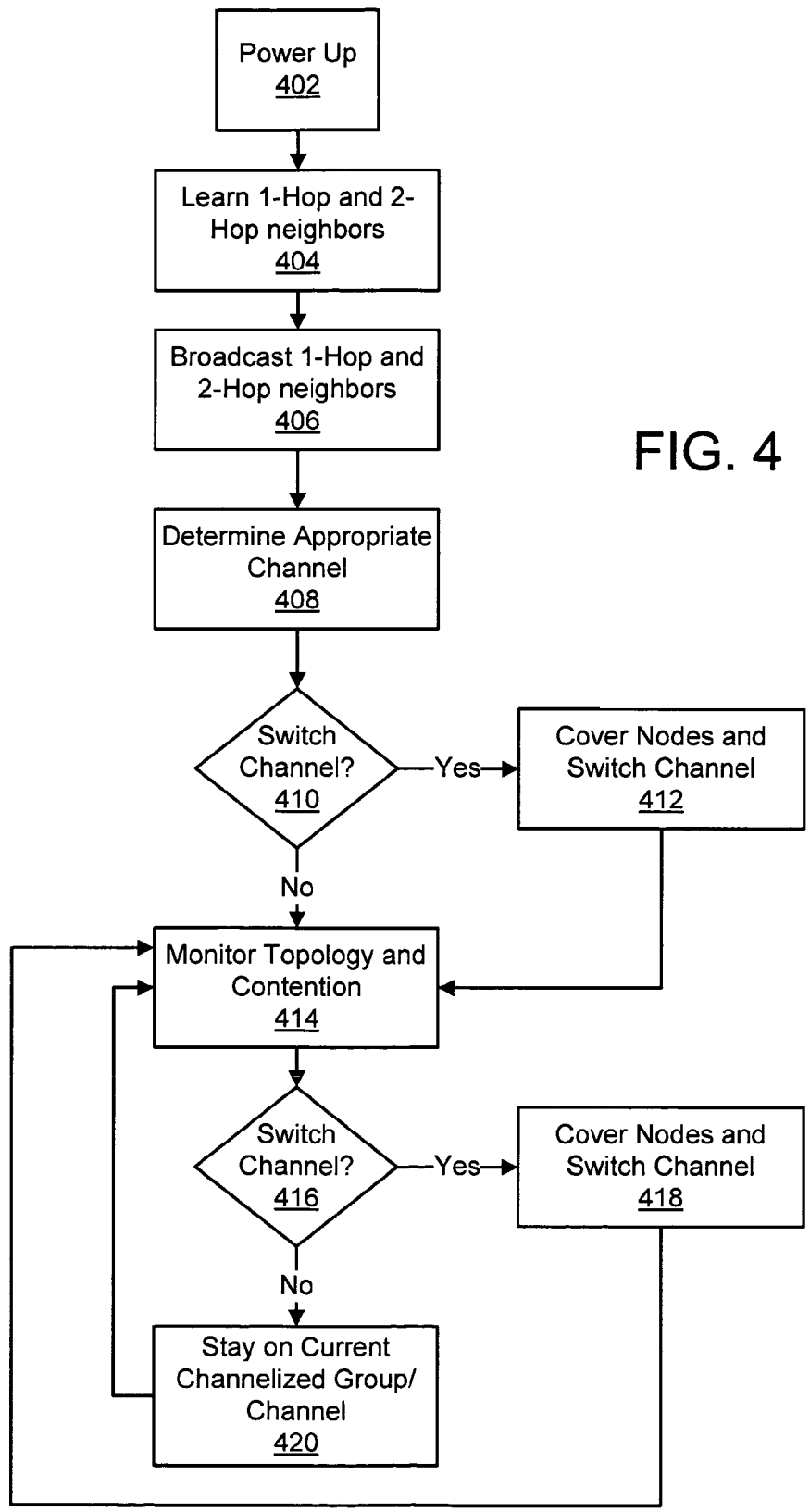
FIG. 4 illustrates a method for forming channelized groups of nodes in a wireless communication network in accordance with an embodiment.

FIG. 4 illustrates a method for forming channelized groups of nodes in a wireless communication network in accordance with an embodiment. Upon power up of a node at block 402, the node gathers information about the surrounding topology of the network. At block 404, the node learns its 1-hop and 2-hop neighbors. For example, a node may listen to its global bootstrap slots in an ODMA frame to determine its 1-hop and 2-hop neighbors. A identifier of a node's 1-hop and 2-hop neighbors may be stored in memory 210 (shown in FIG. 2). At block 406, the node broadcasts the identity of its 1-hop and 2-hop neighbors to its 1-hop neighbors. For example, the 1-hop and 2-hop neighbors may be broadcast in bootstrap slots for other nodes to hear. The node may also transmit information identifying the channel it is currently operating on in the bootstrap slots.

At block 408, the node determines the appropriate channel on which it should operate. The appropriate channel may be determined based on whether there will be channel contention on the channel on which the node is currently operating. In one embodiment, each channel group (and its associated channel) has a maximum number of channelized group slots (e.g., a maximum slot limit) provided in the Multiple Access (MAC) Layer for transmission of information (e.g., data messages). In other words, there is a maximum number of broadcast slots on a specific channel. The maximum slot limit may be provided, for example, by user inputs such as via a COMPLAN. The maximum slot limit value (e.g., channel A may have a maximum slot limit of 10) may be stored in the memory of each node. Channel contention may occur where there are more nodes within 1-hop and/or 2-hops of the node than there are slots for transmission. For example, two nodes in a channelized group interfere with each other if both radios use the same time slot and are 1-hop or 2-hops away from each other. Accordingly, each node 200 (shown in FIG. 2) in the network is configured to determine when there will be channel contention based on a channel's maximum number of slots for transmission.

Figure 5:
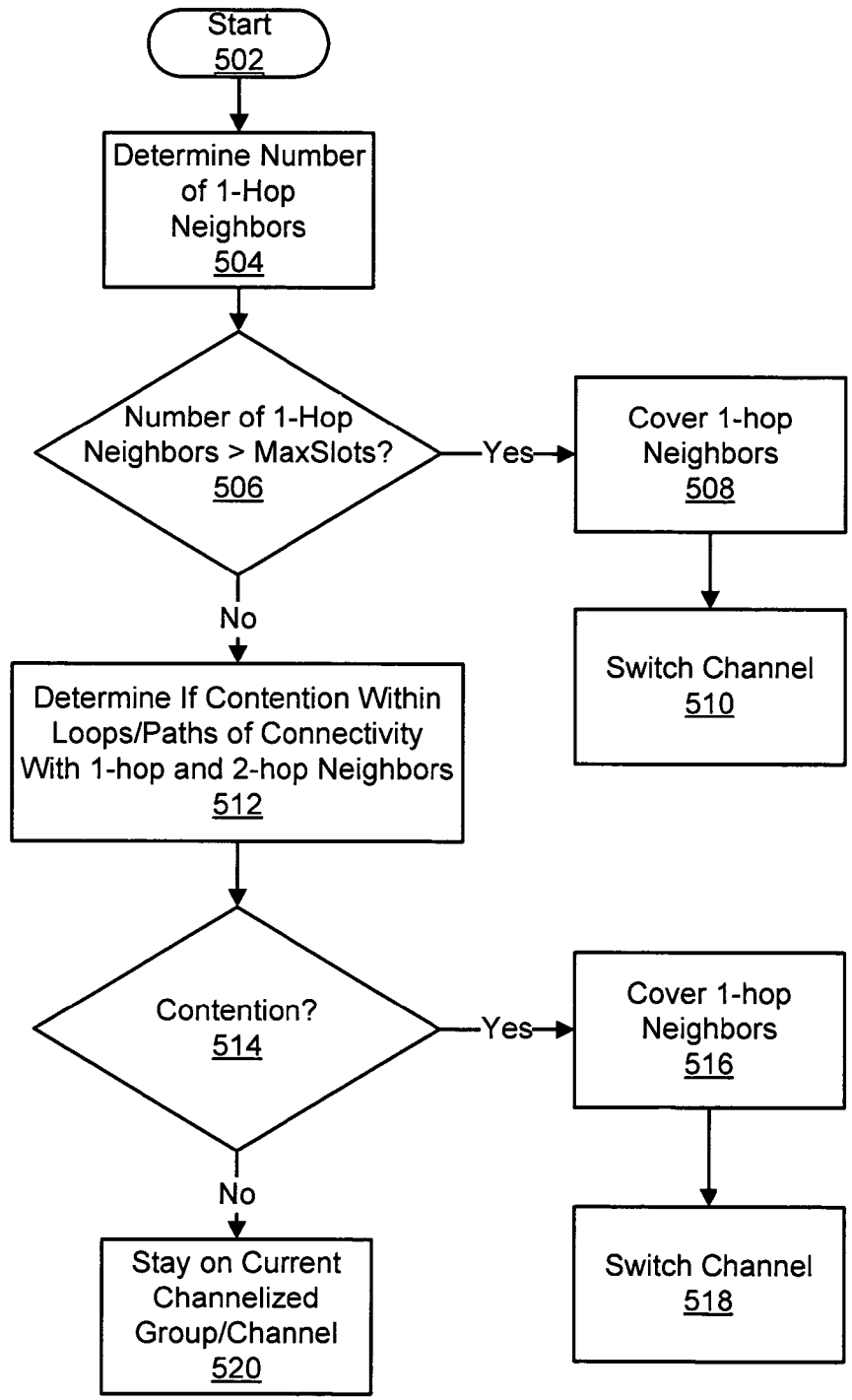
FIG. 5 illustrates a method for determining an appropriate channel for a node in a wireless communication network in accordance with an embodiment.

FIG. 5 illustrates a method for determining an appropriate channel for a node in accordance with an embodiment. First, it is determined whether the node has too many 1-hop neighbor nodes operating on the same channel (i.e., more 1-hop neighbors than the maximum number of slots available for transmission). At block 504, the number of 1-hop neighbors for the node is determined, for example, as mentioned above, the node may listen on bootstrap slots to identify its 1-hop neighbors. The number of 1-hop neighbors is compared to the maximum number of slots for the channel on which the node is currently operating. If the number of 1-hop neighbors plus one is greater than the maximum number of slots at block 506, the node, in one embodiment, will then cover a number of nodes (e.g., a number of 1-hop neighbor nodes) at block 508 and migrate (i.e., switch or change) to a different channel at block 510. In one embodiment, the node may cover the number of 1-hop neighbors equivalent to the maximum number of slots minus one. For example, if the maximum number of slots for the channel is five, the node will cover four 1-hop neighbors. The node and the covered nodes will then switch or migrate to a different channel forming a new channelized group or joining a channelized group. Preferably, the node transmits a list of nodes that it covers and the channel group to operate. The covered list allows a single node to identify a group of nodes that should group themselves together on the same channel. When a node hears that it has been covered, the node should transmit this information and its channel group information in bootstrap slots to inform neighboring nodes that it is no longer available to be covered. According, in a preferred embodiment, a node will cover 1-hop and 2-hop neighboring nodes that have not been covered. In an alternative embodiment, the node may migrate by itself to a different channelized group (that is capable of supporting the node) without covering any other nodes.

In one embodiment, a node will switch to a channelized group that is adjacent to the node's current channelized group. If a node is a gateway node between two or more adjacent channelized groups, the node may maintain a list of adjacent channelized groups in, for example, a memory. In addition, a node should only attempt to join an adjacent channelized group that is able to support the addition, i.e., when a channelized group reaches its maximum slot limit within a 2-hop neighborhood, it will reject further requests to join from nodes not currently a member of the channelized group. Only when one or more members of the channelized group leaves, making room for other nodes, will additions be made to the channelized group up to the maximum slot limit. If the number of 1-hop neighbors is not greater than the maximum number of slots at block 506, it is determined whether there is possible contention in loops or paths of connectivity via the 1-hop and 2-hop neighbors for the node at block 512. For example, the different possible loops incident on the node may be identified to ensure that there are not more nodes than the maximum number of slots in any of the loops that share at least half their edges with one another. In one embodiment, all the unique vertices of the overlapping loops with connectivity with the node are summed and indicate the number of slots necessary to allow contention-free communications. If the number of unique vertices is greater than the maximum number of slots, then there is possible contention at block 514 and the node will cover a number of nodes (e.g., 1-hop neighbor nodes) at block 516 and migrate to a different channel at block 518. In one embodiment, the node may cover at most the same number of nodes as the maximum number of slots. For example, if the maximum number of slots per channel is five, the node will cover up to five nodes and move to a different channel. In an alternative embodiment, the node does not cover any other nodes and migrates by itself to a different channel. If, at block 514, there is no possible contention, the node stays on the current channel, i.e., in the same channelized group at block 520.

Returning to FIG. 4, if it is determined that the node should switch channels at block 410, the node will cover a number of nodes and switch channels at block 412. As mentioned, in an alternative embodiment, the node does not cover any other nodes and migrates by itself to a different channel. The process then proceeds to block 414. If the node remains on the same channel at block 410, the process proceeds to block 414. Once the appropriate initial channelized group for the node is determined, as described above, the node continues to monitor the topology and contention of the channelized group and the network at block 414. As the topology of the network changes (e.g., due to movement of the mobile nodes), the node may determine it should change its channelized group membership. Accordingly, each node 200 (shown in FIG. 2) is configured to adapt to the dynamic topology of the ad hoc network and ensure that channelized groups are allocated properly to avoid slot contention on any single channel.

If there is possible contention, the node may switch channels at block 416. Contention may be determined based on the number of 1-hop neighbors and the topology of loops of connectivity incident on the node as described above. In addition, the determination of whether a node should switch may be based on a number of additional factors or characteristics. The number of 1-hop neighbors in the node's current channelized group may be compared to the number of 1-hop neighbors in a neighboring (or adjacent) channelized group. If the number of 1-hop neighbor nodes in the neighboring channelized group is greater then the number of 1-hop nodes in the current channelized group, the node may consider switching channels. In addition, historical data, such as traffic patterns and traffic flows, may be used to determine future traffic flows. For example, if a group of nodes communicates extensively and these nodes come close together, they may be placed within the same channelized group to reduce latency. In another example, two nodes on different channels may have an extensive history of communication between themselves. As the two nodes move close to one another, one of the nodes may switch to the same channel as the other node so they share a common channel for potential future communications.

The historical data may be stored in a memory 210 (shown in FIG. 2) of the node. In one embodiment, each node maintains an N×N matrix that identifies a crude communication history between nodes, where N represents the number of nodes in the network. As packets of data are communicated between a source and destination pair, the corresponding value in the matrix is incremented to represent the data flow. In one embodiment, the matrix at each node may be periodically sorted to generate a list of destination nodes ordered based on the amount of traffic sent to the destination node.

Other factors and characteristics may also be considered in the determination of whether to switch channels, such as, factors that could cause instability in the network if the node does switch to a different channelized group. For example, if the node is a Bridge node between two adjacent channel groups, a change to a different channelized group may not be desirable as these nodes are strategically located within their channelized group to provide efficient communications within and between channelized groups. In another example, if contention within a channelized group occurs (e.g., there are more nodes than slots) then nodes that do not have any communications in progress may be forced to migrate to a different channel group before nodes that do have communications in progress.

At block 416, if it is determined that the node should switch channels, the node covers a number of nodes (e.g., 1-hop neighbor nodes) and switches channels at block 418. The process then returns to block 414 where the node continues to monitor the network topology and contention to determine if the node should migrate to a different channel. If, at block 416, it is determined that a node should not switch channels, the node remains on the current channel (i.e., in the same channelized group) at block 420 and continues to monitor the network topology and contention to determine if the node should migrate to a different channel at block 414.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method for forming channelized groups in a wireless communication network having a plurality of nodes, the method comprising: determining for at least one node assigned to a first channel that is associated with a channelized group having a first set of nodes whether there is contention between the at least one node and the first set of nodes; and switching the at least one node from the first channel to a second channel based on the contention determination; wherein determining whether there is contention further comprises determining contention within loops of connectivity for the at least one node by summing unique vertices of overlapping loops with the at least one node and comparing the number of unique vertices to a maximum number of transmission slots for the first channel, and wherein determining contention comprises determining if a number of one-hop neighbors of the at least one node is greater than the maximum number of transmission slots for the first channel.

2. A method according to claim 1, wherein the loops include 1 hop and 2 hop neighbors.

3. A method according to claim 1, further comprising covering a second set of nodes and switching the second set of nodes from the first channel to the second channel.

4. A method according to claim 1, further comprising:
monitoring a topology of the network; and
switching the at least one node from the first channel to a second channel based on the topology of the network.

5. A method according to claim 4, wherein monitoring the topology of the network includes monitoring data regarding communications between the at least one node and the plurality of nodes in the network.

6. A method according to claim 4, further comprising covering a second set of nodes and switching the second set of nodes from the first channel to the second channel.

7. A node for a wireless communication network, the node assigned to a first channel associated with a channelized group having a first set of nodes, the node comprising: an antenna; a transceiver coupled to the antenna and configured to transmit and receive messages; and a control circuit coupled to the transceiver and configured to determine whether there is contention with the first set of nodes and to switch operation from the first channel to a second channel based on the contention determination; wherein determining whether there is contention further comprises determining contention within loops of connectivity for the node by summing unique vertices of overlapping loops with the node and comparing the number of unique vertices to a maximum number of transmission slots for the first channel, and wherein determining contention comprises determining if a number of one-hop neighbors of the at least one node is greater than the maximum number of transmission slots for the first channel.

8. A node according to claim 7, wherein the loops include 1 hop and 2 hop neighbors.

9. A node according to claim 7, wherein the control circuit is further configured to cover a second set of nodes and switch operation of the second set of nodes from the first channel to the second channel.

10. A node according to claim 7, wherein the control circuit is further configured to monitor a topology of the network and to switch operation from the first channel to a second channel based on the topology of the network.

11. A node according to claim 10, wherein monitoring the topology of the network includes monitoring data regarding communications between the at least one node and the plurality of nodes in the network.

12. A node according to claim 10, the control circuit is further configured to cover a second set of nodes and switch operation of the second set of nodes from the first channel to the second channel.

13. A method according to claim 1, wherein a sum of the unique vertices are compared to a maximum number of slots.

14. A method according to claim 13, wherein the sum is of all the unique vertices of overlapping loops.

15. A method according to claim 14, wherein the node is part of a self-organizing military wireless network.

16. The node according to claim 15, wherein the node is part of a self-organizing military wireless network.

17. A radio for a joint tactical radio system, the radio being assigned to a first channel associated with a channelized group having a first set of radio nodes, the radio comprising: an antenna; a transceiver coupled to the antenna and configured to transmit and receive messages; and a control circuit coupled to the transceiver and configured to determine whether there is contention with the first set of nodes and to switch operation from the first channel to a second channel based on the contention determination; wherein determining whether there is contention further comprises determining contention within loops of connectivity for the radio by summing unique vertices of overlapping loops with the radio and comparing the number of unique vertices to a maximum number of transmission slots for the first channel, and wherein determining contention comprises determining if a number of one-hop neighbors of the at least one node is greater than the maximum number of transmission slots for the first channel.

18. A radio according to claim 17, wherein the loops include 1 hop and 2 hop neighbors.

* * * * *